(12) United States Patent
Lee

(10) Patent No.: US 7,642,705 B2
(45) Date of Patent: Jan. 5, 2010

(54) ELECTRON EMISSION DEVICE AND METHOD OF MANUFACTURING THE SAME

(75) Inventor: Su-Kyung Lee, Suwon-si (KR)

(73) Assignee: Samsung SDI Co., Ltd., Suwon-si (KR)

( * ) Notice: Subject to any disclaimer, the term of this patent is extended or adjusted under 35 U.S.C. 154(b) by 513 days.

(21) Appl. No.: 10/999,108

(22) Filed: Nov. 29, 2004

(65) Prior Publication Data

US 2005/0134168 A1 Jun. 23, 2005

(30) Foreign Application Priority Data

Nov. 29, 2003 (KR) .............. 10-2003-0086107

(51) Int. Cl.
*H01J 1/62* (2006.01)
(52) U.S. Cl. .................. 313/496; 313/495
(58) Field of Classification Search .......... 313/495–498
See application file for complete search history.

(56) References Cited

U.S. PATENT DOCUMENTS 5,565,742 A * 10/1996 Shichao et al. .............. 315/366
5,779,920 A * 7/1998 Chadha et al. .............. 313/415
5,939,823 A * 8/1999 Kiyomiya et al. ........... 313/495
5,949,184 A * 9/1999 Ohoshi et al. ............... 313/485
6,329,759 B1 * 12/2001 Tanaka et al. ............. 315/169.3
6,486,923 B1 * 11/2002 Maeshima et al. .......... 348/649

FOREIGN PATENT DOCUMENTS

JP          6-267419        9/1994

OTHER PUBLICATIONS

Patent Abstracts of Japan, Publication No. 06-267419, dated Sep. 22, 1994, in the name of Hideo Shinohara et al.

* cited by examiner

*Primary Examiner*—Mariceli Santiago
*Assistant Examiner*—Christopher M Raabe
(74) *Attorney, Agent, or Firm*—Christie, Parker & Hale, LLP

(57) ABSTRACT

An electron emission device and a method of manufacturing the same. The electron emission device of the present invention includes at least one anode formed on one side of a substrate, and a light emitter including a plurality of multiple divided phosphor layers formed on the anode at predetermined intervals. At least one of the phosphor layers has at least one partition pattern. The phosphor layer structure of the present invention is capable of maintaining superior color coordinate characteristics and greatly improving luminance characteristics.

14 Claims, 2 Drawing Sheets
(1 of 2 Drawing Sheet(s) Filed in Color)

ELECTRON EMISSION DEVICE AND METHOD OF MANUFACTURING THE SAME

CROSS-REFERENCE TO RELATED APPLICATION

This application claims priority to and the benefit of Korean Patent Application No. 10-2003-0086107 filed on Nov. 29, 2003 in the Korean Intellectual Property Office, the entire content of which is incorporated herein by reference.

BACKGROUND OF THE INVENTION (a) Field of the Invention

The present invention relates to an electron emission device and a method of manufacturing the same, and more particularly, to an electron emission device capable of maintaining superior color coordinate characteristics and greatly improving luminance characteristics and a method of manufacturing the same.

(b) Description of the Related Art

Generally, a flat panel display includes a vacuum vessel having a first and a second substrate facing each other with a distance therebetween. The flat panel display provides for electrons emitted from the electron emitting region formed at the first substrate colliding with the light emitting region formed at the second substrate, thereby emitting light and displaying a desired image. Hot or cold cathodes may be used as the electron emission sources.

The light emitting region includes green, blue, and red phosphor layers and a black layer. FIG. 1 is a schematic diagram showing the structure of a conventional light emitting region. There is depicted green phosphor layer 13G, blue phosphor layer 13B, red phosphor layer 13R, and black layers 17.

First, a black layer having an equally spaced stripe pattern is formed, and then green, blue, and red phosphor layers are formed by the slurry method to give the structure shown in FIG. 1. The apparent line widths of each color are substantially identical.

However, if an electron emission device with the light emitting region is manufactured by the conventional method, luminance characteristics or color characteristics of each color become poorer than expected. For example, the red light-emitting luminance becomes lower than the blue light-emitting luminance, thereby making the luminance characteristics poor.

SUMMARY OF THE INVENTION

In accordance with the present invention exemplary embodiments of an electron emission device capable of maintaining superior color coordinate characteristics and greatly improving luminance characteristics, and a method of manufacturing the same, are provided.

An exemplary embodiment of the electron emission device includes at least one anode formed on one side of a substrate; and a light emitting region which includes a plurality of divided patterned phosphor layers spaced at predetermined intervals on the anode and is formed on one side of the anode. At least one of the phosphor layers has a multiple partition pattern.

An exemplary embodiment of the electron emission device includes at least one anode formed on one side of a substrate; and a light emitting region which includes a plurality of divided patterned green, blue, and red phosphor layers spaced by predetermined intervals on the anode and which is positioned on one side of the anode. At least one of the green and blue phosphor layers has a single pattern and the red phosphor layer has at least one partition pattern.

An exemplary embodiment of the electron emission device includes a first substrate and a second substrate opposing each other spaced at predetermined intervals and joined by a sealing agent to form a vacuum container. Cathodes are formed on the first substrate. An electron emission region is connected to the cathode. Gate electrodes are positioned on the cathode between insulating layers surrounding the electron emission region. At least one anode is formed on the second substrate and a light emitting region including a plurality of divided patterned green, blue, and red phosphor layers are positioned with predetermined intervals on the anode, in which at least one of the green, blue, and red phosphor layer has a multiple partition pattern.

Also in accordance with the present invention, a method of manufacturing an electron emission device is provided including: (a) forming at least one anode on a second substrate; and (b) forming at least one green, blue, and red phosphor layers at the light-emitting region on the second substrate with predetermined intervals by a slurry method, in which at least one of the green, blue, and red phosphor layers has at least one partition pattern.

The electron emission device may have at least one black layer between the phosphor layers.

Also, at least one of the green, blue, and red phosphor layers may have a double partition pattern.

Also, the method of manufacturing the electron emission device may further include the step of forming at least one black layer at the non-light-emitting region of the second substrate, between the steps (a) and (b).

BRIEF DESCRIPTION OF THE DRAWINGS

The application file contains at least one drawing executed in color. Copies of this patent application publication with color drawings will be provided by the Office upon request and payment of the necessary fee.

DETAILED DESCRIPTION

Figure 1:
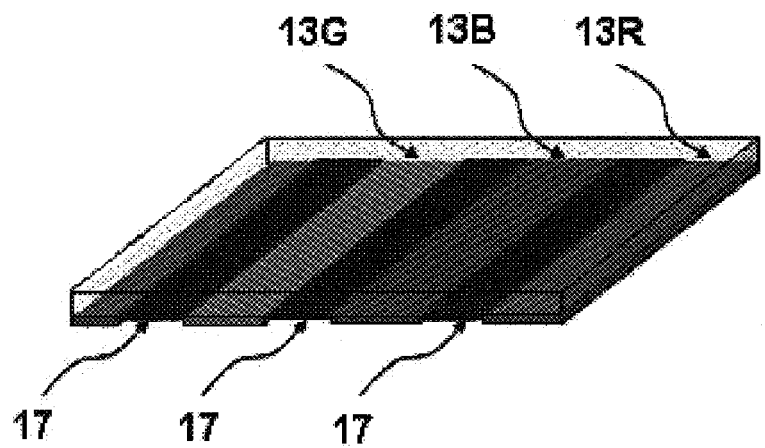
FIG. 1 is a schematic perspective diagram of a conventional light emitting region including green, blue, and red phosphor layers of a single stripe pattern.

The present invention relates to an electron emission device capable of improving optical characteristics, such as luminance and color coordinate, by forming multiple partition phosphor layers for the colors having relatively reduced characteristics to satisfy the luminance and color coordinate requirements needed for an anode panel and a method of manufacturing the same.

The phosphor layer pattern of red, green, and blue phosphor layers may be increased by forming more lines, for the colors having poor characteristics.

The present invention can maintain superior color coordinate characteristics and improve luminance characteristics through the formation of a multiple partition pattern. That is, a phosphor having superior color coordinate characteristics but poor luminance and another phosphor having poor color coordinate but superior luminance characteristics under a particular deriving condition (voltage and current density) are formed as each line.

At least one partition pattern may be formed in the present invention. The partition pattern may be a stripe or mesh, but, it is not limited to these methods.

Also, at least one of the green, blue, and red phosphor layers may have a multiple partition pattern.

In an exemplary embodiment of the present invention, a line of a red phosphor layer is formed beside a blue phosphor layer to form at least one partition pattern, in order to solve the problem of blue light-emitting luminance lower than red light-emitting luminance.

In the present invention, the multiple partition patterned phosphor layers may be substantially identical or different, and at least two different phosphors may be used for each color.

Of the phosphors used to form at least one partition pattern in accordance with the present invention, the red phosphor may be at least one selected from the group consisting of $Y_2O_3:EU$, $Y_2O_2S:Eu$, and $Ca_xSr_{1-x}S:EU$, where $0<x<1$. Also, ZnS:Ag, Cl, a blue phosphor, and ZnS:Cu, Al, a green phosphor, etc. may be used. However, the phosphors used in accordance with the present invention are not limited to these examples.

In accordance with the present invention, the area of the phosphor layers having at least one partition pattern may be substantially identical or different.

In one exemplary embodiment, a proportion of the area of the at least one of the green, blue, and red phosphor layers having at least one partition pattern to the area of other phosphor layers ranges from 1:1 to 1:1.8. If the proportion of the area of the phosphor layer having at least one partition pattern is smaller, improvement of the phosphor characteristics is slight. Otherwise, if it is larger, the white balance may be broken due to concentrated light emission of the phosphor having a multiple partition pattern.

To take a red phosphor layer having a one partition pattern as an example, the green and blue phosphor layers may have equal areas, and the red phosphor layer may have an area ranging from 1:1 to 1:1.8 of that of the green or blue phosphor layer.

The electron emission device of the present invention may include at least one black layer between the phosphor layers. Here, the black layer may be a black matrix layer.

A proportion of the area of the black layer to the area of the phosphor layer having at least one partition pattern may range from 1:1 to 1:2. If the proportion of the area of the black layer is smaller, the contrast becomes poor. Otherwise, if it is larger, the luminance becomes poor.

To take a red phosphor layer having a one partition pattern as an example, the black layer preferably has an area ranging from 1:1 to 1:2 of that of the red phosphor layer.

Hereinafter, exemplary embodiments of the present invention will be described in more detail referring to the appended drawings.

Figure 2:
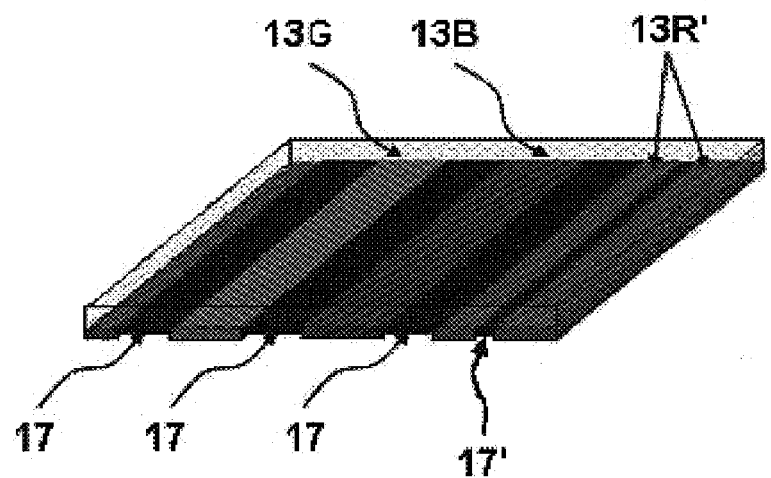
FIG. 2 is a schematic perspective diagram of a light emitting region including the red phosphor layer of a double partition pattern according to an exemplary embodiment of the present invention.

FIG. 2 is the schematic diagram of the light emitting region including a double stripe red phosphor layer according to an exemplary embodiment of the present invention. In order to solve the problem of relatively poor color quality of a red phosphor compared with green and blue phosphors, a red phosphor layer 13R' having a double stripe pattern is formed beside the blue phosphor layer 13B, so that the light emitting region of the present invention includes a green phosphor layer 13G, a blue phosphor layer 13B, a red phosphor layer 13R' having a double stripe pattern, and a black layer 17 positioned between these phosphor layers. In the red phosphor layer having a double stripe pattern, black layer 17' is positioned between the red phosphor layer stripes. That is, for the color that requires characteristics improvement, a double stripe pattern may be formed, or two substantially identical or different phosphors may be formed into a phosphor layer.

Figure 3:
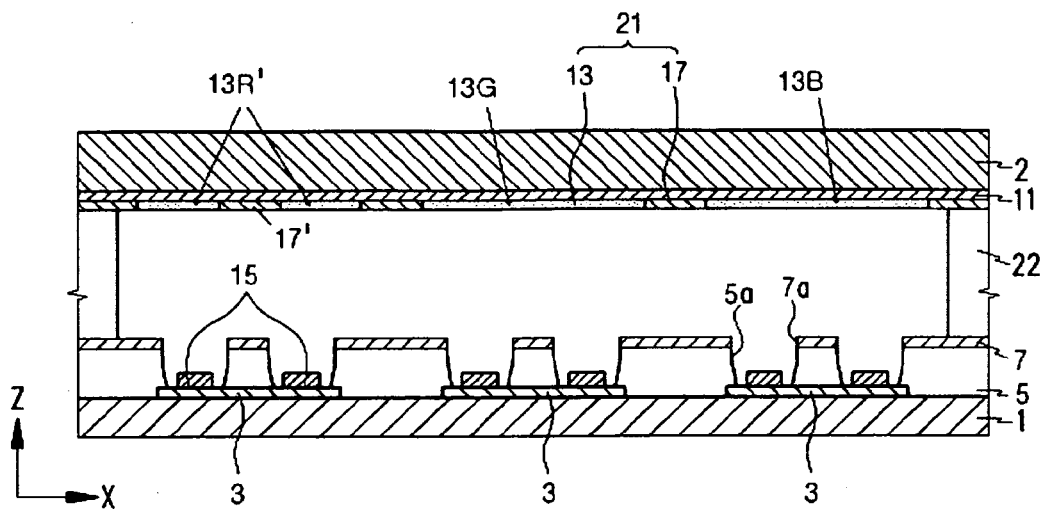
FIG. 3 is a partial cross-sectional view of electron emission according to an exemplary embodiment of the present invention.

FIG. 3 is the partial cross-sectional view of the electron emission device according to an exemplary embodiment of the present invention. The electron emission device of the present invention includes a first substrate (or cathode substrate) 1 and a second substrate (or anode substrate) 2, which are positioned parallel with each other with a predetermined interval therebetween and are joined together to form a vacuum container. Inside the vacuum container, an electron emission region capable of emitting electrons is formed on the first substrate 1 and a light emitting region capable of emitting light by the electrons emitted from the electron emission region, thereby offering an image, is formed on the second substrate 2. For example, the light emitting region may have the following structure.

A cathode 3, an insulating layer 5, and a gate electrode 7 are formed on the first substrate 1, and an anode 11 and a phosphor layer 13 are formed on the second substrate 2. The cathode 3 and the gate electrode 7 have division patterns perpendicular to each other. At the region where the cathode 3 and the gate electrode 7 intersect, holes 5a and 7a that penetrate the gate electrode 7 and the insulating layer 5 are formed. An electron emission region (e.g., an emitter) 15 is connected to the cathode 3 electrically exposed by the holes 5a and 7a. In this embodiment of the present invention, the electron emission region is positioned at the edge of the cathode 3 for each pixel area. Here, the pixel area of the electron emission device is defined by the intersection of the gate electrode 7 and the cathode 3. The electron emission region may be positioned at the center of the cathode and may be formed by screen printing or photolithography.

The electron emission materials composing electron emission region 15 can be of a carbon based material, nanometer-sized material or combination thereof. For example, the carbon based material may include carbon nanotubes, graphite, diamond, diamond-like carbon, C60 (fullerene), and so on; and the nanometer-sized material may be carbon nanotubes, graphite nanofiber, silicon nanowire and so on. The electron emission region may include at least one selected from the group consisting of a carbon nanotubes, graphite, diamond, diamond-like carbon, C60 (fullerene), graphite nanofiber, silicon nanowire and a combination thereof, as an electron emission source.

The shape of the electron emission region 15 is not limited to the described example. For example, it may have a conical shape. That is to say, the shape of the electron emission region 15 is not particularly limited.

The insulating layer 5 may have a thickness of about 20 µm. It may be formed by reiterating the process of printing, drying, and firing a dielectric paste. The dielectric paste may have a common composition.

The gate electrode 7 is formed into a stripe pattern perpendicular to the cathode 3 by depositing a electrically conductive material on the insulating layer 5 and patterning it. The holes 5a and 7a penetrating the gate electrode 7 and the insulating layer 5 at the region where the cathode 3 and the gate electrode 7 intersect are formed by the conventional photolithographic process.

When a paste composition for forming an electron emission region is coated on the cathode 3 after the holes penetrating the gate layer and the insulating layer have been formed, the conductive carbon based material formed over the cathode 3 and the gate electrode 7 may cause a short circuit of the two electrodes. A sacrificial layer may be selectively used to prevent short circuits of the electrodes. However, this is not essential, and the emission device may be formed without a surface sacrificial layer.

The resultant electron emission region 15 emits electrons by the electron distribution formed between the cathode 3 and the gate electrode 7 by a voltage applied from outside of the vacuum container.

The paste composition used to form the electron emission region of the present invention may include a carbon based material, inorganic powder, a binder resin, and an organic solvent.

The carbon based material is not particularly limited, and may be a carbon based material, nanometer-sized material or a combination thereof. For example, the carbon based material may include carbon nanotubes, graphite, diamond, diamond-like carbon, C60 (fullerene), and so on; and the nanometersized material may include carbon nanotubes, graphite nanofiber, silicon nanowire and so on.

The inorganic powder, a glass frit, the binder resin, and the organic solvent may be the ones used in preparation of a paste of the conventional carbon based material (preferably carbon nanotubes), but is not particularly limited to such materials. If required, a photosensitive resin and a UV initiator may be further included.

The cathode 3 is formed along a direction on the first substrate 1 with a determined pattern, e.g. a division pattern, and the insulating layer 5 is formed over the first substrate 1 covering the cathode 3.

On the insulating layer 5, a plurality of gate electrodes 7 having holes 7a connected with the holes 5a formed on the insulating layer 5 are formed. These gate electrodes 7 are formed into a division pattern with predetermined intervals therebetween, perpendicular to the cathode 3.

The structure of the electron emission region of the present invention is not limited to the above description. For example, the following structure is possible. A gate electrode is formed on a first substrate, which is a cathode substrate. A cathode is formed on the gate electrode with an insulating layer between the two electrodes. Then, an electron emitter is electrically connected with the cathode. The light emitting region includes an anode 11 formed on one side (the side opposing the first substrate) of the second substrate 2 and a phosphor layer 13 of red phosphor layer 13R', green phosphor layer 13G, and blue phosphor layer 13B formed on the anode 11, as shown in FIG. 4.

Figure 4:
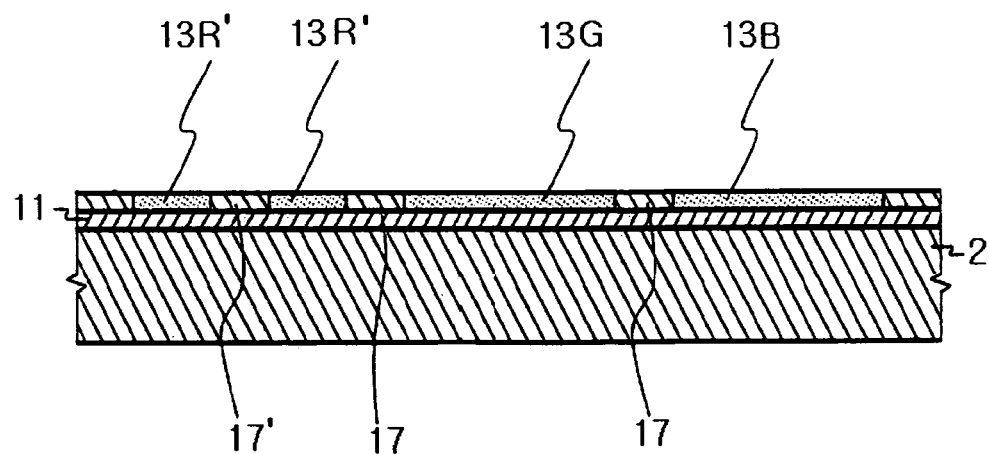
FIG. 4 is a partial cross-sectional view of the part of the substrate including the light emitting region according to an exemplary embodiment of the present invention.

To be specific, at least one anode 11 is formed on the side of the second substrate 2 opposing the first substrate 1, and at least one partition phosphor layer 13 of red phosphor layer 13R', green phosphor layer 13G, and blue phosphor layer 13B is formed on the anode 11 at determined intervals, as shown in FIG. 4.

The anode 11 is made of a transparent conducting film, e.g. an ITO film, and a black layer 17 improving display contrast is formed at the non-light-emitting region between the phosphor layers 13. The black layer 17 and the phosphor layers 13 constitute the light emitting region 21. The anode 11 may be formed into a stripe pattern by the conventional photolithographic process.

The phosphor layers 13 include multiple stripe phosphor layers spaced apart by determined intervals, and in an exemplary embodiment green phosphor layer 13G and blue phosphor layer 13B each having single pattern and a red phosphor layer 13R' having a one partition pattern beside the blue phosphor layer, between which the black layer 17 is positioned.

If a metal film is to be formed without a gap from the black layer 17, a surface flattening layer, that is, a filming layer, may be selectively formed on the black layer, which is removed by baking.

A metal film, e.g. a thin aluminum film, which improves display luminance by the metal back effect, may be formed on the light emitting region 21.

The phosphor layers 13 may be formed on the anode 11 by electrophoresis, screen printing, spin coating, and so forth.

The composition of the slurry for forming the green, blue, and red phosphor layers is not particularly limited, but in an exemplary embodiment includes a phosphor, a photosensitive resin, a solvent, a dispersing agent, a thickening agent, etc.

The photosensitive resin may be a polyester acrylate based resin, but is not limited to this.

The solvent may be an organic solvent such as butyl cellosolve (BC), butyl carbitol acetate (BCA), terpineol (TP), and so forth.

The composition of the present invention may further include a photosensitive monomer, a photoinitiator, a vinylic non-photosensitive polymer such as cellulose and acrylate, a dispersing agent, an antifoaming agent, and so forth, as required.

The photosensitive monomer may be a thermally decomposable acrylate based monomer, a benzophenone based monomer, an acetophenone based monomer, a thioxantone based monomer, etc., and more specifically epoxy acrylate, polyester acrylate, 2,4-diethyloxanthone, or 2,2-dimethoxy-2-phenylacetophenone. The photosensitive monomer may be of 1 to 70 wt %. The photoinitiator may be one conventionally used, and its content is not particularly limited.

The black layer 17 may be made of a thin chromium oxide film or a thick carbon based film such as graphite.

Between the first substrate 1 and the second substrate 2, a plurality of spacers 22 are positioned to maintain the spacing of the two substrates. These spacers 22 are positioned at the non-light-emitting region, that is at the black layer 17, to avoid an effect on electron emission and light emission.

When a driving voltage is applied to the gate electrode 7 and the cathode 3, an electric field is formed around the electron emission region 15 because of the potential difference of the two electrodes, and electrons are emitted from the electron emission region 15. And, if a positive voltage of hundreds to thousands of volts is applied to the anode 11, the electrons emitted from the electron emission region 15 are attracted to the phosphor layer 13 and excite it to emit visible light.

Hereinafter, the present invention is described in more detail through examples. However, the following examples are only for the understanding of the present invention, and the present invention is not limited by them.

EXAMPLES

Examples 1 and 2

$In_2O_3$ was sputtered on a transparent substrate, and then etched to form a division patterned anode. A black layer was formed between the anode pattern. A slurry of $In_2O_3$ coated green, blue, and red phosphors was coated on the transparent substrate, and then dried and exposed to light. The phosphor slurry, which had not been hardened, was removed by developing with a low voltage nozzle. Then, the substrate was dried, and green, blue, and red phosphor layers were formed to prepare an anode. A cathode, a gate electrode, and an electron emitter were formed by the conventional method to manufacture an electron emission device.

In Example 1, the red phosphor layer was formed into a stripe pattern using $Y_2O_2S$:Eu as the main phosphor, as shown in Table 1. And, a double stripe pattern was formed using $Y_2O_3$:Eu to improve luminance characteristics.

In Example 2, the red phosphor layer was formed into a stripe pattern using $Y_2O_2S$:Eu as the main phosphor. And, a double stripe pattern was formed using $Ca_xSr_{1-x}S$:Eu to improve color characteristics.

The double stripe pattern was obtained by forming another stripe beside the stripe of the red phosphor layer during formation of the black layer.

The proportion of the linewidth of the red phosphor layer having a double stripe pattern to that of the green and blue phosphor layers was set to be 1:1. The linewidths of the two stripes of the red phosphor layer double stripe pattern were set to be substantially identical.

And, the proportion of the linewidth of the black layer to that of the entire red phosphor layer was set to be 1:2.

The green and blue phosphor layers were formed into a single stripe pattern using the conventional slurry composition.

The slurry for forming the green, blue, and red phosphor layers further included a photosensitive resin, a solvent, a dispersing agent, and a thickening agent in addition to the phosphor.

Light-emitting luminance of the electron emission device including the red phosphor layer having a double stripe pattern was measured. The results are given in the following Table 1.

TABLE 1

|  | Phosphor | Efficiency (1 kV, L/W) | Color coordinate |
|---|---|---|---|
| Example 1 | $Y_2O_2S$:Eu | 3.6 | 0.652, 0.336 |
|  | $Y_2O_3$:Eu | 5.4 | 0.649, 0.343 |
| Example 2 | $Y_2O_2S$:Eu | 3.6 | 0.652, 0.336 |
|  | $Ca_xSr_{1-x}S$:Eu | 0.66 | 0.703, 0.300 |

As seen in Table 1, the double stripe patterned red phosphor layer according to the present invention contributed to preventing reduction of light-emitting luminance.

As described above, the multiple partition patterned phosphor layer, which is obtained by adding a sub-partition for a color which requires improvement of characteristics, prevents reduction of light-emitting luminance and improves optical characteristics.

While the present invention has been described in detail with reference to the exemplary embodiments, those skilled in the art will appreciate that various modifications and substitutions can be made thereto without departing from the spirit and scope of the present invention as set forth in the appended claims.

What is claimed is:

1. An electron emission device comprising:
   at least one anode on one side of a substrate;
   a light emitting region on one side of the anode;
   a plurality of phosphor layers separated from each other on the anode; and
   a black layer on the anode between each of the separated plurality of phosphor layers, wherein at least one of the phosphor layers is split into at least two portions, the at least two portions being separated by the black layer on the anode, and
   wherein a proportion of an area of the at least one of the phosphor layers being split into at least two portions to an area of at least one other phosphor layer ranges from 1:1 to 1:1.8.

2. The electron emission device of claim 1, wherein the at least one of the phosphor layers comprises at least one of green phosphor layers, blue phosphor layers, and red phosphor layers.

3. The electron emission device of claim 1, wherein the at least one of the phosphor layers being split into at least two portions has a double stripe pattern.

4. The electron emission device of claim 3, wherein a proportion of an area of the black layer to an area of the phosphor layer being split into at least two portions ranges from 1:1 to 1:2.

5. The electron emission device of claim 3, wherein the at least one of the phosphor layers being split into at least two portions is a red phosphor layer.

6. The electron emission device of claim 5, wherein the red phosphor layer is at least one selected from the group consisting of $Y_2O_3$:Eu, $Y_2O_2S$:Eu, and $Ca_xSr_{1-x}S$:Eu, where 0<x<1.

7. An electron emission device comprising:
   at least one anode on one side of a substrate; and
   a light emitting region on one side of the anode and having green phosphor layer, blue phosphor layer, and red phosphor layer separated from each other by a black layer on the anode,
   wherein the green phosphor layer and blue phosphor layer have a single pattern and the red phosphor layer is split into at least two portions having a sub-divided phosphor layer pattern, the green phosphor layer, the blue phosphor layer and the portions of the split red sub-divided phosphor layer pattern being separated by the black layer, and
   wherein a proportion of an area of the red phosphor layer to an area of the green phosphor layer or the blue phosphor layer ranges from 1:1 to 1:1.8.

8. The electron emission device of claim 7, wherein the sub-divided phosphor layer pattern is a double stripe pattern.

9. The electron emission device of claim 7, wherein a proportion of an area of the black layer to an area of the red phosphor layer ranges from 1:1 to 1:2.

10. The electron emission device of claim 7, wherein the red phosphor layer is at least one selected from the group consisting of $Y_2O_3$:Eu, $Y_2O_2S$:Eu, and $Ca_xSr_{1-x}S$:Eu, where 0<x<1.

11. An electron emission device comprising:
   a first substrate and a second substrate spaced apart from each other and joined by a sealing agent to form a vacuum container;
   cathodes on the first substrate;
   electron emission regions electrically connected to respective cathodes;
   gate electrodes between insulating layers surrounding the respective electron emission regions;
   at least one anode on the second substrate; and
   a light emitting region on the at least one anode and having green phosphor layer, blue phosphor layer, and red phosphor layer separated from each other by a black layer on the at least one anode, wherein at least one of the green phosphor layer, blue phosphor layer, and red phosphor layer is split into at least two portions having a sub-divided phosphor layer pattern, the green phosphor layer, the blue phosphor layer, the red phosphor layer and the portions of the split red sub-divided phosphor layer pattern being separated by the black layer, and wherein a proportion of an area of the at least one of the green phosphor layers, blue phosphor layers, and red phosphor layers having the sub-divided phosphor layer pattern to an area of at least one other phosphor layer ranges from 1:1 to 1:1.8.

12. The electron emission device of claim 11, wherein a proportion of an area of the black layer to an area of the phosphor layer having the sub-divided phosphor layer pattern ranges from 1:1 to 1:2.

13. The electron emission device of claim 11, wherein the phosphor layer having the sub-divided phosphor layer pattern is a red phosphor layer.

14. The electron emission device of claim 13, wherein the red phosphor layer is at least one selected from the group consisting of $Y_2O_3$:Eu, $Y_2O_2$S:Eu, and $Ca_xSr_{1-x}$S:Eu, where $0<x<1$.

* * * * *